United States Patent

Gough

[11] Patent Number: 4,666,032
[45] Date of Patent: May 19, 1987

[54] POCKET ELEVATOR

[75] Inventor: George T. Gough, Newcastle, England

[73] Assignee: Gough & Company (Hanley) Limited, England

[21] Appl. No.: 774,073

[22] Filed: Sep. 9, 1985

[30] Foreign Application Priority Data

Sep. 12, 1984 [GB] United Kingdom ............... 8423075

[51] Int. Cl.⁴ .......................................... B65G 15/14
[52] U.S. Cl. ................................. 198/626; 198/690.2
[58] Field of Search ........................... 198/626–628, 198/699, 716, 690.2, 698, 731

[56] References Cited

U.S. PATENT DOCUMENTS 3,147,850 9/1964 Ronceray ..................... 198/716
3,881,590 5/1975 Hartmann .................... 198/626

FOREIGN PATENT DOCUMENTS

1204135 10/1965 Fed. Rep. of Germany ...... 198/627
583761 1/1925 France ......................... 198/626
57-102712 6/1984 Japan .......................... 198/716
59-149212 8/1984 Japan ......................... 198/690.2
673546 7/1979 U.S.S.R. ...................... 198/626

Primary Examiner—L. J. Paperner
Assistant Examiner—D. Glenn Dayoan
Attorney, Agent, or Firm—Silverman, Cass, Singer & Winburn, Ltd.

[57] ABSTRACT

An elevating conveyor which operates as a pocket elevator to transfer granular, powdered or like material from a loading station through an elevating section to a discharge zone wherein an endless conveyor belt cooperates with a further conveyor part. The belt has transverse bars on its surface preferably located between belt side walls and facing the further conveyor part. The height of the bars is adjusted to have a clearance between it and the further conveyor part which corresponds to between 1 and 3 times the maximum particle size of the material being conveyed and preferably being above 1.5 times the maximum particle size.

22 Claims, 8 Drawing Figures

POCKET ELEVATOR

This invention relates to an elevating conveyor which operates as a pocket elevator and is suitable for transferring granular, powdered or like material from a first location to a second location which may be vertically and horizontally spaced from the first location. The conveyor would be suitable for handling such materials as sugar, grain, peas, cement, flour, sand or coal which could be at least partially crushed. Obviously, therefore, the conveyor could have many uses in many different industries.

It is known to convey materials such as those described above from a first location to a second location by locating the material to be conveyed between two moving belts or between a moving belt and a fixed plate, and the belt or one of the belts as the case may be, may be provided with transverse flight bars or nubs on its surface although this is not essential. It is preferred, however, that the belt has a generally trough shaped cross-section, e.g. it may be provided with side walls, and if desired this belt can be held in contact with the other belt or fixed plate either by means of external pressure applied pneumatically or mechanically, or by means of suction on that side of the belt on which the material being elevated is located. A list of known patent specifications disclosing such elevating conveyors is given in the specification accompanying our European patent application Nos. 85303749.7 and 85304607.6.

A problem with most of the prior art conveyors is that they can only be operated at relatively low speeds and many can only be operated at low angles of delivery. This is because of problems in holding the two belts or the belt and plate together in an elevating section and/or because of the different speeds with which the two belts pass around guide pulleys resulting from the different radii about which the belts have to travel. This relative belt movement results in friction between the belts.

We have now developed an elevating conveyor wich can either have twin belts or a single belt which cooperates with a fixed plate in an elevating section of the elevating conveyor, and which performs as a pocket elevator/conveyor. This elevating conveyor has the advantage over known elevating conveyors which act as pocket elevators in that there is little or no damage to the product during loading and during elevating and, furthermore, because the conveyor operates as a pocket elevator/conveyor rather than an "en masse" elevator/conveyor, it is possible to empty the conveyor of material being conveyed merely be continuing to run the conveyor and not feeding further material into it.

According to the present invention, we provide an elevating conveyor comprising a loading section and an elevating section leading to a discharge zone and wherein an endless conveyor belt is provided to convey material at least through the elevating section, said belt co-operating with a further conveyor part to form a closed space for said material, means to cause said belt to move in an upward direction through the elevating section and wherein transverse bars are provided on the surface of the belt facing the further conveyor part, at spaced intervals, the height of the said transverse bars being almost sufficient to bridge the gap between the surface of the belt and the opposed surface of the further conveyor part, but having a clearance with the further conveyor part which corresponds to between one and three times the maximum particle size of the material being conveyed and elevated.

Preferably, the clearance is equal to 1.5 times the maximum particle size.

Preferably, the belt is provided with a pair of spaced side walls between which the transverse bars are located; in one preferred construction the side walls may have a grooved top surface which may co-operate with strips of low friction material on the other conveyor part. In another preferred construction, the belt is formed with corrugated side walls, preferably with a generally W or WM profile; such side walls have excellent durability and are laterally stable, and hence form a good seal with the other conveyor part. They are also very extensible and compressible, which is an advantage when the belt is entrained around guide rollers.

Preferably also, the belt is provided with lateral extensions externally of the side walls, to accommodate guide or pressure rollers. Preferably also, the belt is stiff in the transverse direction, to minimize leakage between itself and the other conveyor part, i.e. it has a cross-carcass.

Preferably, the transverse bars are secured in position between the side walls with an adhesive or in other known manner. If desired, they may be removably secured in position so that they may be replaced with transverse bars of a different height if a different material is to be conveyed. Alternatively, it is envisaged that the height of the transverse bars may be adjustable.

In one arrangement, the belt may be manufactured with a plurality of standard transverse bars extending to a height equal to about three-eights of the height of the side walls, and further "snap-on" removable bars of the desired height are then located over the standard bars. This enables different bar heights to be used for different materials. Alternatively, if the belt is to be used for conveying only one material, it can be manufactured with standard height bars which are then machined to the desired height, using guide templates on either side of the bar to give the correct height.

In one construction the further conveyor part may comprise a second endless conveyor belt which extends at least through the elevating section and moves in the same direction and at substantially the same speed as the first mentioned endless conveyor belt. This second belt may be provided with trapezium shaped side walls which co-operate with side walls on the first mentioned belt to help form a seal therewith and if desired with a tracking rib on its rear face.

Alternatively, the further conveyor part may comprise a fixed plate. In this alternative construction, two arrangements are possible. In the first arrangement the endless conveyor belt in the loading section faces upwardly and material to be handled by the elevating conveyor is top fed onto the conveyor belt and is then conveyed generally horizontally until the belt moves round a guide pulley following which the belt co-operates with a fixed plate extending through the elevating section of the conveyor. If the conveyor has a generally Z-shape the material is then conveyed generally horizontally in a direction away from the loading section by the belt alone to the discharge zone. If, however, the conveyor has a generally C-shape then the fixed plate must be extended generally horizontally at least partially to overlie the loading section, in which case a multiple discharge facility can be provided by means of suitable discharge apertures in the plate.

In the alternative arrangement, a fixed plate which would extend generally through the elevating section is extended in a generally horizontal direction to the loading section and in the loading section the face of the endless conveyor belt having the transverse bars thereon faces generally downwards so as to provide a bottom feed arrangement. At the loading section a hopper may be provided, a wall of which leads downwardly to merge with the fixed plate in the loading section. If desired, a feed belt may convey material to the hopper.

In this second arrangement, if the elevating conveyor has a generally Z-shape, then the fixed plate must be extended at the top of the elevating section into the discharge zone and mulitple discharge can be achieved by means of a plurality of discharge apertures in the extension of the plate. Alternatively, if the conveyor is generally C-shaped, the endless belt must extend over a suitable guide pulley so as to overlie the loading section, in which case discharge would be off the end of the belt run.

In both of the single belt arrangements where the belt co-operates with a fixed plate, it is preferred that the fixed plate is generally of shallow U-shape cross-section with the ends of the arms of the U being turned outwardly to co-operate with lateral extensions of the belt, with the depth of the U being just sufficient to accommodate side walls on the belt.

Four embodiments of the invention are now described by way of example with reference to the accompanying drawings, in which.

In the drawings, like parts are identified with the same reference numerals throughout the various views.

Figure 1:
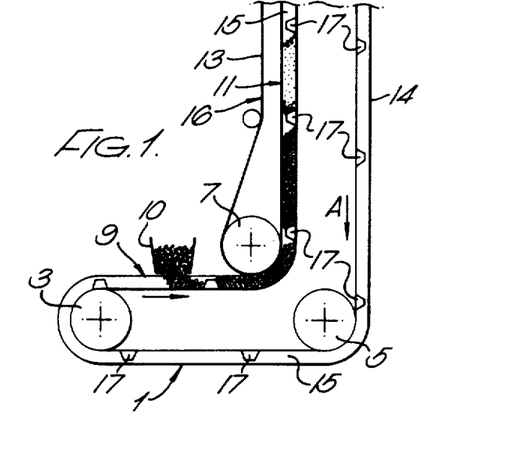
FIG. 1 is a partly schematic side elevation showing a loading section and part of an elevating section of one embodiment of elevating conveyor incorporating two endless belts.
Figure 2:
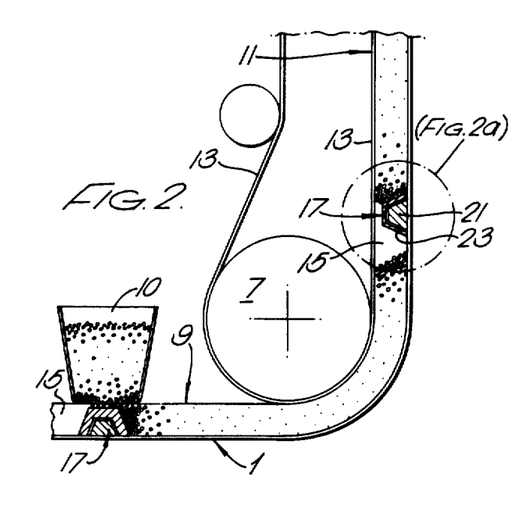
FIG. 2 is an enlarged view of part of the conveyor shown in FIG. 1.
Figure 2A:
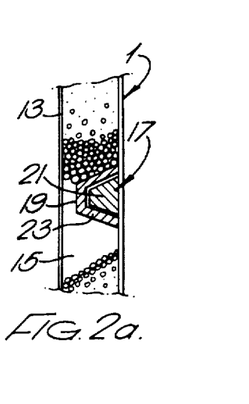
FIG. 2a is a detail of part of FIG. 2.

Referring to FIGS. 1 and 2 of the drawings, the elevator/conveyor comprises a first endless belt 1 entrained around lower guide pulleys 3, 5 and 7 and at its other end (not shown) about further guide pulleys. The pulleys 3 and 5 are at the same horizontal level so that the upper horizontal run 9 of the belt 1 comprises a loading section, to which material to be moved by the belt is fed through a loading hopper 10. One of the guide pulleys is driven from a power source (not shown) so that the belt 1 moves at the required speed in the direction of the arrows A.

The pulley 7 and one of the upper pulleys (not shown) are so located that after the loading section 9, the belt 1 extends through an elevating section 11 of the conveyor. In this elevating section 11, the belt 1 co-operates with a further conveyor part, as shown a second endless belt 13, also entrained around the pulley 7 and a further pulley (not shown) at the top of the elevating section 11. Return runs of the belts are shown at 14 and 16 respectively.

The belt 1 is provided with side walls 15, preferably of the construction disclosed in our European Patent Application No. 85301235.9, which define with the belt surface a trough for material to be conveyed. At spaced intervals, this trough is interrupted by transverse bars 17, dividing the trough into a plurality of pockets. The top face of the walls 15 bear against the face of the belt 13 in the elevating section, to which strips of low friction material (e.g. TEFLON) are fitted (or which may be made entirely of low friction material) to prevent heat build up, and hence belt wear where the two belts pass around the same pulley (e.g. pulley 7). In the elevating section, the belts 1 and 13 are held together either by rollers or pressure plates, or by pneumatic means, or in any other manner (not shown).

The transverse bars 17 are of isosceles, trapezium shaped cross-section, and may be permanently or removably located on the belt 1 between the side walls 15 with adhesive, or in other manner (e.g. with hidden boltlike fixings), so as to form a fluid-tight seal with the belt surface and its side walls 15. The height of the bars 17 is crucial for efficient operation of the elevator/conveyor, and will depend upon the particle size of the material being handled. In any event, the ideal height of the bars 17 is such that their upper surface is located at a distance below the upper surface of the side walls 15 corresponding to about 1.5 times the maximum particle size of the material being handled. This distance could, however, vary from about equal to average particle size to about three times maximum particle size. The reason for this can be seen in FIG. 2.

Referring to FIG. 2, it will be seen that material fed onto the belt 1 in the loading section 9 from the hopper 10 will be carried by the belt 1, round the pulley 7 into the elevating section 11 where it will be enclosed by the belt 13. In the elevating section, it will be partially raised by frictional engagement with the belts 1 and 13 and the side walls 15, but it will also be lifted by the transverse bars 17, the free surfaces 19 of which are spaced from the surface of the belt 13 as described above. This means that the material being elevated will settle down onto the bars 17, and will not slip between surfaces 19 and the belt 13 due to bridging or locking occurring (see FIG. 2).

As can be seen from FIG. 2, one way of forming the bars 17 is to manufacture the belt 1 with a plurality of spaced transverse bars 21 of standard height, e.g. about three-eighths of the height of the side walls 15, and of predetermined spacing, e.g. about 30 ins. In order to obtain the correct bar height for the particular material to be elevated, removable "snap-on" overbars 23 are then fitted to the standard bars 21. The user of the elevator may be provided with several different sets of overbars 23 for use in elevating materials of different particle size, and with the above-described construction, it is very easy to change the overall bar height.

Alternatively, if the conveyor is to be used for only one material, and there is no requirement for different heights for the bars 17, these can be manufactured initially at almost the same height as the side walls 15, and then be ground down to the required height to suit the material being handled, using suitable height guides located temporarily on each side of each bar 17.

The number of bars 17 on belt 1, and their spacing will depend upon the elevating height of the conveyor and the nature of the material being handled. For example, for a conveyor with a height of ten metres for elevating flour, the bar spacing would preferably be about two metres, whereas for a five metre elevating conveyor for peas, the spacing would be about one metre. However, for a twenty-five metre high elevating conveyor for gravel, the spacing would be about three metres. The transverse bars create a number of pockets of material to reduce the vertical pressure within each pocket area.

By providing the transverse bars 17, the elevating conveyor acts as a pocket elevator instead of an "en masse" elevator. This means that in the elevating section, several columns of material are present, separated by the bars 17, thus eliminating possible compression damage which may occur in a single vertical column (with no bars).

Furthermore, there is no damage to the product at the loading section 9 or when belt 1 moves beneath the belt 13 as they move around the pulley 7, because of the clearance above the top surface 19 of the bars 17.

Another major advantage of bars 17 is the ability to empty the conveyor merely by stopping the feed through hopper 10. This is not possible with a "no bar" en masse conveyor. The conveyor must be stopped, and a temporary bar or "pig" inserted.

Also with a "no bar" en masse conveyor, it will only work when the vertical elevating section is full of material, supported by a horizontal limb in the loading section. This means there can be costly product losses. However, this problem does not arise with the pocket elevator of the present invention.

It will be appreciated that instead of the bars 17 being provided on the belt 1, they may be provided on the belt 13. This may also alternatively or additionally apply to the side walls 15.

Likewise, the further conveyor part, instead of being a driven moving belt 13, may be a fixed plate, for example, as described in our European Patent Application No. 85303749.7 or as will now be described herein with reference to FIGS. 3-7.

Figure 3:
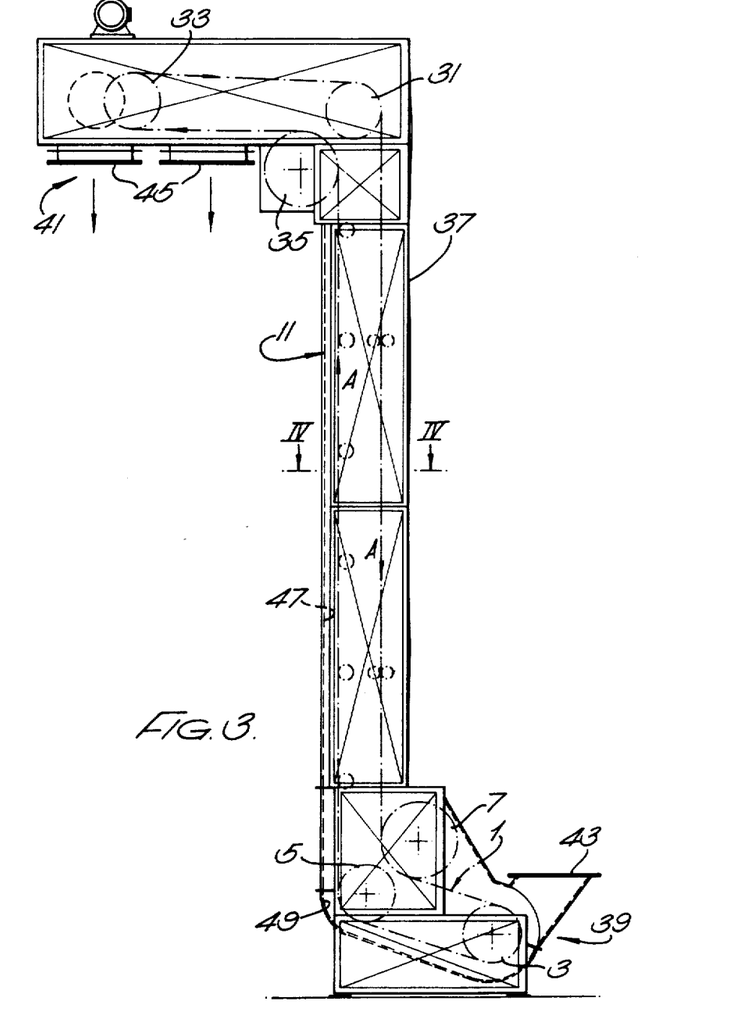
FIG. 3 is a side elevation showing a second embodiment of elevating conveyor incorporating only one endless belt co-operating with a fixed plate.

Referring now to FIG. 3, a generally Z-shaped elevating conveyor is illustrated wherein a single endless belt 1 (which may be identical to the belt described with reference to FIGS. 1 and 2) is entrained around lower pulleys 3, 5 and 7 and upper pulleys 31, 33 and 35. The conveyor belt is totally encased in an overall casing 37 provided with suitable inspection doors at different levels and a loading section is indicated generally at 39 and a discharge zone is indicated generally at 41. The loading section is designed for bottom feed in that material to be elevated by the conveyor is fed to the loading section through a material inlet 43 from which it is transferred by the belt 1 to the discharge zone 41. Because the conveyor is generally Z-shaped, multiple discharge is possible, there being two slide gates 45 provided at the discharge zone 41 for this purpose. Either one or both of the gates can be opened to discharge elevated material and of course if the belt 1 was divided into two side-by-side sections, by suitably aligning the gates 45, one with each section, discharge of two different materials being elevated by the belt could be carried out at different locations simultaneously.

In the elevating section 11 of the conveyor, the belt 1 co-operates with a fixed plate 47 as will be described more fully with reference to FIG. 4. The plate 47 extends from closely adjacent the pulley 35 to the bottom of the elevating section 11 where it is connected to an extension plate 49 which extends in an arc parallel with the surface of the pulley 5 and is then downwardly inclined and terminates in a further arc extending parallel to the surface of the pulley 3 where it is sealingly connected to a loading hopper 43. Accordingly, the plate 47 and its extension 49 extends in parallel spaced relationship with the runs of the belt 1 from the pulley 3 to the pulley 5 and from the pulley 5 to the pulley 35. Thus, as material is fed to the hopper 43 so it is transported by the bars 17 (not shown in FIG. 3) on belt 1 as it is advanced in the direction of the arrows A from the loading section through the elevating section to the discharge zone 41, with the plate 47 and extension 49 thereof defining with the belt successive chambers for the material being elevated.

Figure 4:
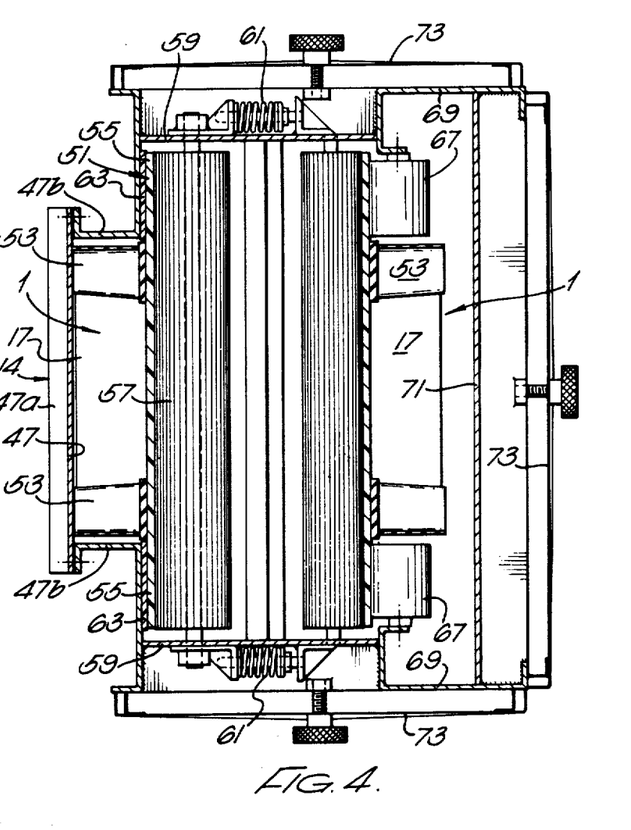
FIG. 4 is a section on the line IV—IV of FIG. 3 to an enlarged scale.

Referring now to FIG. 4, it will be noted that the belt 1 of the conveyor shown in FIG. 3 is preferably formed from a flat base strip 51 to which corrugated side walls 53 are connected. The side walls 53 are spaced inwardly from the edges of the base strip 51 so as to leave lateral extensions 55 and between the side walls 53 are a plurality of longitudinally spaced transverse bars 17. The general configuration of the corrugated side walls 53 can be seen more clearly in FIG. 7; briefly, the side walls are made up of a corrugated strip secured to a foundation strip which may be cold adhesed to the base strip 51. For maximum flexibility, the corrugated strips have a generally WM configuration but other formations are possible. Belts marketed under the trade mark HARBAWELL, or especially modified variants thereof, are particularly suitable.

In the elevating section 11 of the conveyor, the fixed plate 47 is of composite construction having a main portion 47a which co-operates with a central portin of the belt 1 including the side walls 53 and bars 17 and two lateral portions 47b defined by two generally L-shaped plates which co-operate with the lateral belt extensions 55. In the elevating section the lateral extensions 55 are biased against the plate portions 47b by means of a plurality of pressure rollers 57 slidably supported on a frame member 59 and biassed towards the plate 47 by coil springs 61. To minimize heat build-up between the lateral extensions 55 and the plate portions 47b, linings 63 of low-friction material are secured to the plate portions 47b.

After passing around the pulleys 35, 33 and 31, at the top of the elevating section 11, the belt 1 in its return run through the elevating section 11 is guided between fixed rollers 65 supported on the frame member 59 and short guide rollers 67, each of which is mounted on a further frame member 69 of identical section to the plate portions 47b secured respectively to the frame members 59. The plate 47 and frame members 59 and 69, plus a further frame member 71 extending between the members 69 together with three removable panels 73 form an overall casing for the conveyor.

If desired, the construction shown in FIG. 3 could be modified from the illustrated Z-shape to a C-shape by moving the discharge zone 41 so that it is generally above the hopper 43 which of course would involve changing the location of the pulleys 31, 33 and 35. In this arrangement the plate 47 would have to be extended upwardly so as to guide material on the belt 1 onto a run of the belt extending towards the discharge zone and the material on the belt would then be discharged over a pulley defining the outer extremity of this run.

Figure 5:
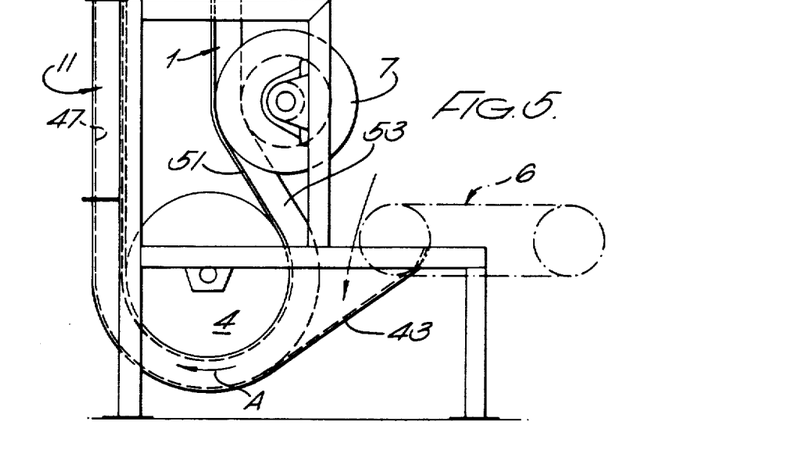
FIG. 5 is a scrap view of the lower portion of the elevating conveyor shown in FIG. 3 showing a modification thereof.

Referring now to the modified construction of the embodiment of FIG. 3 and which is illustrated in FIG. 5, the pulleys 3 and 5 in this modification are replaced by a single larger guide pulley 4 thus making it possible to move the loading hopper 43 to closely adjacent the pulleys 4 and 7. This enables a more compact loading section to be provided and as before, material in the hopper 43 is transported from the hopper 43 to the elevating section 11 by movement of the belt 1 in the direction of the arrow A. If desired, material may be conveyed to the hopper 43 by means of a feed conveyor shown generally at 6.

Figure 6:
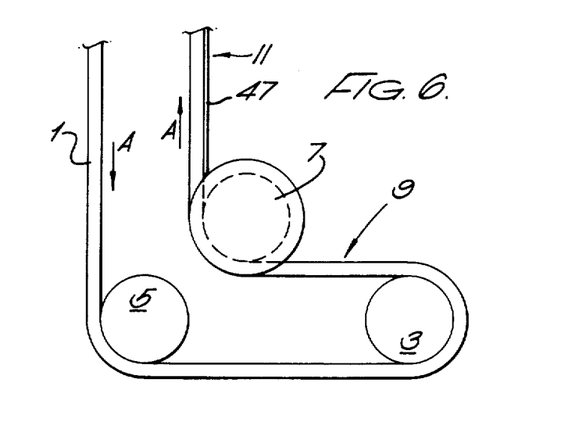
FIG. 6 is a partially schematic view corresponding to FIG. 5 showing a fourth embodiment of the invention and FIG. 7 is a scrap plan view showing a portion of a preferred construction of endless conveyor belt.
Figure 7:
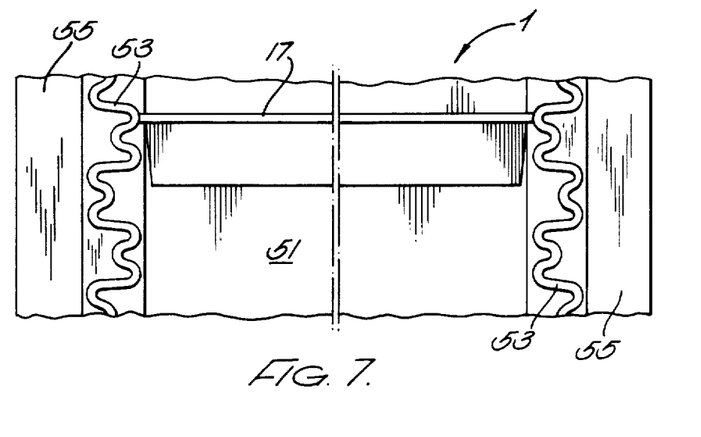

In the embodiment of the invention shown in FIG. 6, a single belt top feed conveyor rather than a single belt bottom feed conveyor is illustrated. This conveyor has many similarities to that shown in FIG. 1 and the single conveyor belt 1 rotates in the same direction illustrated by the arrows A as is shown in Figure 1. However, in the elevating section the belt 1 co-operates with a fixed plate 47 made up of plate portions 47a and 47b and of the same general construction as that described with reference to FIG. 4. Where the belt 1 is entrained around the guide pulley 7, the enlarged diameter portions of the pulley 7 where they engage the lateral extensions 55 of the belt 1 may have their inner faces slightly spaced from the side walls 53 of the belt to enable narrowed down extensions of the plate portions 47b together with strips of low friction material thereon to bear against the belt extensions 55 to ensure a good seal between the moving belt and the fixed plate 47 as the belt moves off the pulley 7 and into the elevating section 11. Material may be fed to the loading section of the belt 1 in the manner shown in FIG. 1. With this top fed single belt conveyor it is possible to provide a generally C-shaped conveyor with a selective discharge feature in the discharge zone similar to that shown in FIG. 3.

One advantage of the single belt configuration shown in FIGS. 3-7, wherein the side walls are made of corrugated material, is that because of the flexibility and thus the extensibility and compressibility of the side walls without losing any lateral stability, an excellent seal can be provided with the fixed plate 47. This means that very fine materials can be conveyed. However, because a fixed plate is provided, some materials, especially less fine ones, can be damaged as they are moved by the moving belt into engagement with and along the fixed plate. Accordingly, if materials which are susceptible to damage are to be conveyed it is preferred to use a twin belt conveyor such as that described with reference to FIG. 1. These conveyors, however, are very expensive to manufacture due to the nature of the side walls of the belt 1. For example, the side walls, due to their mass, have to be hot adhesed to the belt base strip 51. Furthermore, it is not possible to obtain such a good seal between the two moving belts although by stiffening the belt in the transverse direction by using what is known as a cross-carcassed belt, improved sealing characteristics are achieved.

The advantages of elevating conveyors in accordance with the invention are numerous. It has been found that by using corrugated side walls, these can be as high as 2½ inches and in some instances as high as 4 inches and yet the belt can still be advanced at high speed, thus permitting large volumes of material to be moved in quick time. Furthermore, depending on the construction of the conveyor, multi-discharge can be achieved and because of the transverse bars on the belt, the conveyor operates as a pocket conveyor thus relieving pressure in the elevating section on the material being handled.

As well as extending to the various elevating conveyors described herein, the present invention also relates to the various constructions of conveyor belt as described and illustrated and to the methods of elevating and/or conveying as described and illustrated.

It will of course be understood that the present invention has been described above purely by way of example, and modifications of detail can be made within the scope and spirit of the invention.

What is claimed is:

1. An elevating conveyor comprising a frame, a loading section at a lower end of said frame, a discharge zone at an upper end of said frame, and an elevating section between said loading section and said discharge zone, and wherein guide pulleys are supported by said frame and an endless conveyor belt having side walls and which is entrained around said guide pulleys to convey material at least through said elevating section, and wherein a further conveyor part extends at least through said elevating section and said belt co-operates with said further conveyor part to form a closed space for said material to be elevated, and including means to cause said belt to move in an upward direction through said elevating section and wherein transverse bars are provided on the surface of said belt facing said further conveyor part, at spaced intervals, the height of the said transverse bars being almost sufficient to bridge the gap between the surface of said belt and the opposed surface of said further conveyor part, but having a clearance with said further conveyor part which corresponds to between one and three times the maximum particle size of the material being conveyed and elevated.

2. An elevating conveyor according to claim 1 wherein said clearance is equal to 1.5 times the maximum particle size.

3. An elevating conveyor according to claim 1 wherein a pair of spaced side walls is provided on said belt between which said transverse bars are located.

4. An elevating conveyor according to claim 3 wherein said side walls have a grooved top surface which co-operates with strips of low friction material on said further conveyor part.

5. An elevating conveyor according to claim 3 wherein said belt is formed with corrugated side walls.

6. An elevating conveyor according to claim 5 wherein said belt is also provided with lateral extensions externally of said side walls to co-operate with guide or pressure rollers.

7. An elevating conveyor according to claim 5 wherein said belt is stiff in the transverse direction, to minimise leakage between itself and said further conveyor part.

8. An elevating conveyor according to claim 1 wherein said transverse bars are removably secured in position so that they may be replaced with transverse bars of a different height if a different material is to be conveyed.

9. An elevating conveyor according to claim 1 wherein the height of said transverse bars is adjustable.

10. An elevating conveyor according to claim 1 wherein said further conveyor part comprises a second endless conveyor belt which extends at least through said elevating section and moves in the same direction and at substantially the same speed as said first mentioned endless conveyor belt, said second belt co-operates with side walls on the first mentioned belt to help form a seal therewith.

11. An elevating conveyor according to claim 1 wherein said further conveyor part comprises a fixed plate, and wherein said endless conveyor belt in the loading section faces upwardly and material to be handled by the elevating conveyor is top fed onto said conveyor belt and is then conveyed generally horizontally until said belt moves round a guide pulley following which the belt co-operates with said fixed plate extending through said elevating section of the conveyor.

12. An elevating conveyor according to claim 11 which has a generally Z-shape, and wherein the material, after passing through the elevating section, is then conveyed generally horizontally in a direction away from the loading section by said belt alone to said discharge zone.

13. An elevating conveyor according to claim 11 which has a generally C-shape and wherein said fixed plate is extended generally horizontally at least partially to overlie said loading section.

14. An elevating conveyor according to claim 12 wherein a multiple discharge facility is provided by means of suitable discharge apertures in said extended plate.

15. An elevating conveyor according to claim 1 wherein said further conveyor part comprises a fixed plate which extends through said elevating section and is extended in a generally horizontal direction to said loading section and wherein, in said loading section, the face of said endless conveyor belt having said transverse bars thereon faces generally downwards so as to provide a bottom feed arrangement.

16. An elevating conveyor according to claim 15, wherein at said loading section a hopper is provided, a wall of which leads downwardly to merge with said extended fixed plate in the loading section.

17. An elevating conveyor according to claim 16, wherein at the bottom of said elevating section, said belt is entrained around a single guide pulley, adjacent to which is a bottom feed loading section.

18. An elevating conveyor according to claim 15 which has a generally Z-shape, and wherein said fixed plate is extended at the top of said elevating section into said discharge zone and multiple discharge is achieved by means of a plurality of discharge apertures in the extension of said plate.

19. An elevating conveyor according to claim 15 which is generally C-shaped, and wherein said endless belt extends over a suitable guide pulley so as to overlie said loading section, so that material discharge is off the end of the belt run.

20. An elevating conveyor according to claim 11 wherein said fixed plate is generally of shallow U-shape cross-section with the ends of the arms of the U being turned outwardly to co-operate with lateral extensions of said belt, with the depth of the U being just sufficient to accommodate side walls on the belt.

21. An elevating conveyor according to claim 15 wherein said fixed plate is generally of shallow U-shape cross-section with the ends of the arms of the U being turned outwardly to co-operate with lateral extensions of said belt, with the depth of the U being just sufficient to accommodate side walls on the belt.

22. An elevating conveyor comprising a frame, a loading section at a lower end of said frame, a discharge zone at an upper end of said frame, an elevating section between said loading section and said discharge zone, guide pulleys supported by said frame, an endless conveyor belt having side walls and which is entrained around said guide pulleys to convey material at least through said elevating section, a further conveyor part extending at least through said elevating section and which cooperates with said belt to form a closed space for said material to be elevated, means for causing said belt to move in an upward direction through said elevating section, transverse bars provided on the surface of said belt facing said further conveyor part at spaced intervals and extending to a height equal to about three-eighths of the height of said side walls of said belt, and "snap-on" removable bars of the desired height are then located over said standard bars.

* * * * *